Figure 3:
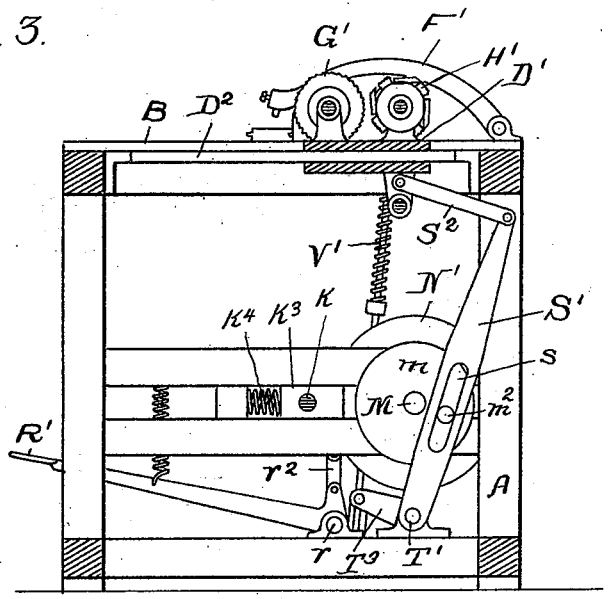

(No Model.)　　　　　　　　　　　　　　　　2 Sheets—Sheet 1.
J. P. BURNHAM.
MACHINE FOR MATCHING ENDS OF FLOORING BOARDS.
No. 518,804.　　　　　　　　　Patented Apr. 24, 1894.
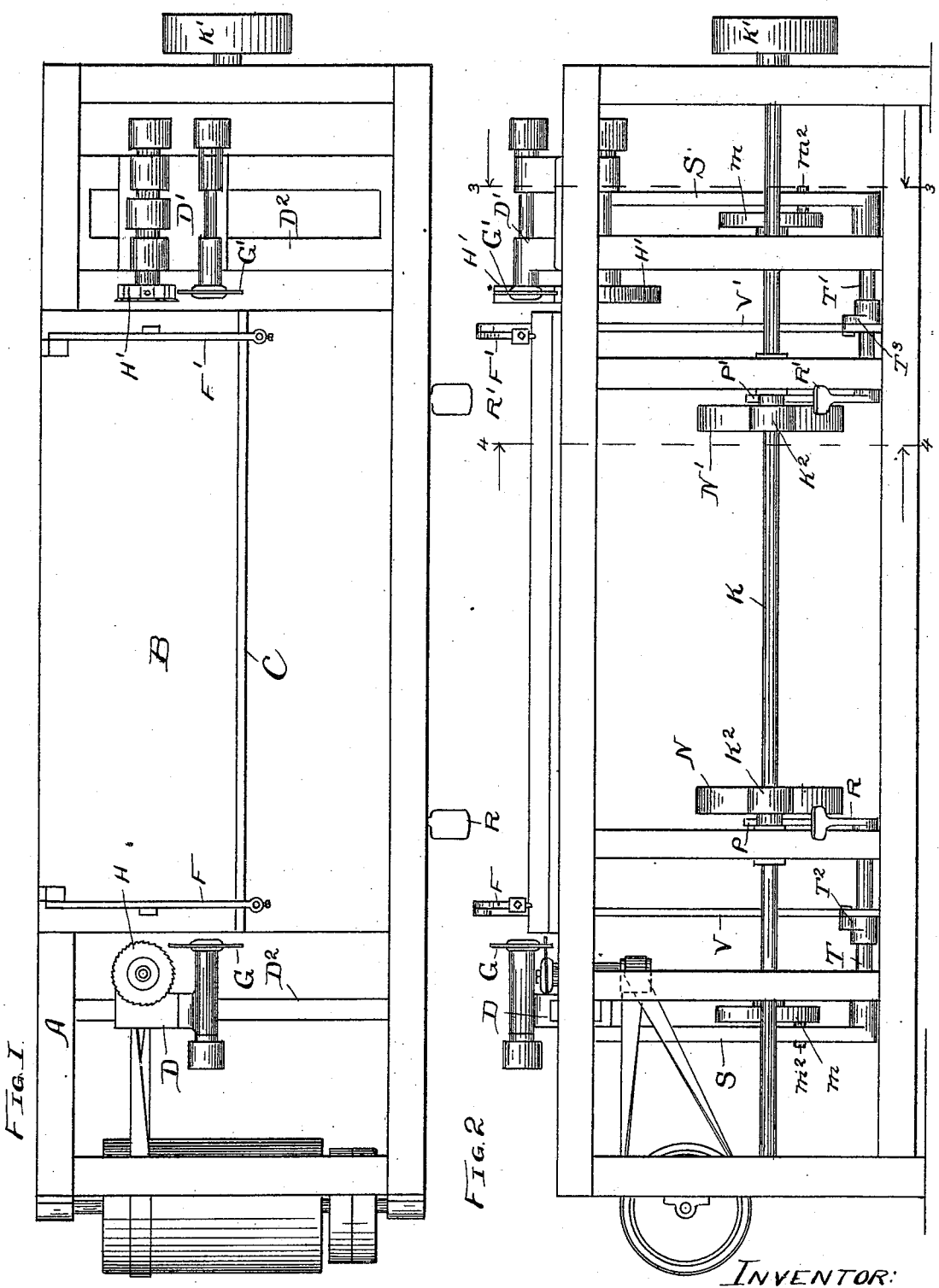
WITNESSES:
Sew. E. Curtis
A. W. Munday
INVENTOR:
JOHN P. BURNHAM
By Munday, Evarts & Adcock.
HIS ATTORNEYS.
THE NATIONAL LITHOGRAPHING COMPANY,
WASHINGTON, D. C.

(No Model.) 2 Sheets—Sheet 2.

J. P. BURNHAM.
MACHINE FOR MATCHING ENDS OF FLOORING BOARDS.

No. 518,804. Patented Apr. 24, 1894.

WITNESSES:
Lew E. Curtis
H. W. Munday

INVENTOR:
John P. Burnham
By Munday, Evarts & Adcock
HIS ATTORNEYS

UNITED STATES PATENT OFFICE.

JOHN P. BURNHAM, OF CHICAGO, ILLINOIS, ASSIGNOR TO THOMAS WILCE, OF SAME PLACE.

MACHINE FOR MATCHING ENDS OF FLOORING-BOARDS.

SPECIFICATION forming part of Letters Patent No. 518,804, dated April 24, 1894.

Application filed March 8, 1894. Serial No. 502,797. (No model.)

*To all whom it may concern:*

Be it known that I, JOHN P. BURNHAM, a citizen of the United States, residing in Chicago, in the county of Cook and State of Illinois, have invented a new and useful Improvement in Machines for Matching the Ends of Flooring-Boards, of which the following is a specification.

My invention relates to machines for matching or forming interfitting tongues and grooves on the opposite ends of flooring boards.

The object of my invention is to provide a machine of a simple construction, by means of which the opposite ends of flooring boards or strips, whatever their length, may be rapidly or cheaply matched or furnished with interfitting tongues and grooves, the ends of the boards being also simultaneously or by the same operation cut off or squared.

The improvement I have devised comprises the following parts combined or arranged to co-operate together to accomplish this work or object, to wit: a table upon which the board may rest while being operated upon first at one end and then at the other; a guide on the table for the side edge of the board, whatever its length, to fit against while being operated upon first at one end and then upon the other; a clamp at or near one end of the guide for holding the board firmly in position while being operated upon at one end; a transversely reciprocating slide or cross head mounted upon the table; a cut off saw mounted upon this cross head for cutting off or squaring one end of the board; a grooving tool or horizontally revolving cutter mounted upon this cross head for forming the horizontal groove in one end of the board after it has been thus squared by the cut off saw; mechanism for reciprocating this cross head; and mechanism for automatically operating this clamp which holds the board in position at one end; a second clamp near the opposite end of the guide for holding the board in position while the opposite end is being operated upon; a second and independently reciprocating cross head; a cut off saw mounted thereon and a pair of vertically revolving cutter heads or tonguing tools mounted on this second cross head; mechanism for reciprocating this second cross head independently of the first cross head, and mechanism for automatically operating the second clamp, said clamp operating mechanism being connected with the mechanism for reciprocating the second cross head. As the two cross heads reciprocate independently of each other, each is withdrawn out of the way of the board while the tools carried by the other are operating upon that end of the board.

Figure 4:
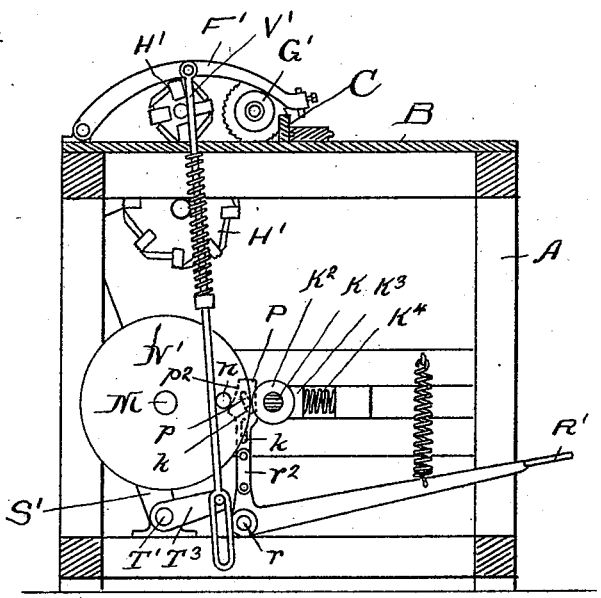

In the accompanying drawings, which form a part of this specification, and in which similar letters of reference indicate like parts, Figure 1 is a plan view of a machine embodying my invention. Fig. 2 is a front view. Fig. 3 is a section on line 3—3 of Fig. 2 and Fig. 4 is a section on line 4—4 of Fig. 2.

In the drawings A represents the frame, B the table, C the guide on the table against which the side edge of the board fits while being operated upon at either end.

D and D' are the two transversely reciprocating slides or cross heads, one at or near each end of the table, the same being mounted in suitable guide ways $D^2$ on the frame.

F and F' are the two independently and automatically operated clamps for holding the board in position first at one end and then at the other.

G and G' are two cut off saws mounted upon and carried by the cross heads D and D' for cutting off or squaring the two ends of the board, first one end and then the other.

H is the grooving tool, the same consisting, preferably, of a horizontally revolving wabble saw mounted upon the cross head D, and it serves to form the horizontal groove in the end of the board after it has been squared by the cut off saw G.

H' H' are two vertically revolving cutter heads or tonguing tools mounted upon the cross head D', and by which the tongue is formed on the opposite end of the board.

K is the driving shaft furnished with a driving pulley K'. This shaft is furnished with two friction wheels $K^2$, $K^2$, and is preferably mounted in movable boxes $K^3$, so that the springs $K^4$ may tend to press the friction wheels $K^2$ normally against the friction wheels N, N' on the shafts M. The friction wheels N, $K^2$ and N', $K^2$ are however, normally held out of contact by a sliding cam or bar P or P', having inclined or cam slots $p$ in which fit the pins $k\,k$ on the movable bearings or boxes $K^3$ $K^3$ of the shaft K. The friction wheels N, N' are provided with pins $n$ adapted to engage the cam faces $p^2$ of the cam bars P or P', and thus move the bearings or boxes $K^3$ and shaft K over sufficiently to separate the friction wheels N, $K^2$ or N' $K^2$. The cam bars P P' are operated by treadles R R', pivoted at $r$ to the frame, and connected by links $r^2$ with the cam bars P P'. On the shafts M, are crank wheels $m$, the pins $m^2$ of which fit in slots $s$ in the levers S S', the upper ends of which are connected by pivoted links $S^2$ with the cross heads D and D' respectively. The lower ends of the levers S S' are fixed to the rock shafts T T', which are furnished at their opposite ends with arms $T^2\,T^3$, which are connected to the slotted connecting rods V V' which operate the clamps F F'.

The operation is as follows: The operator lays the board on the table B with its side edge against the guide C, both cross heads D D' being at this time in their retracted position. He then puts his foot on the treadle R and thus withdraws the cam bar P, so that the friction wheels N, $K^2$ will be forced into contact with each other by the spring $K^4$, thus revolving the shaft M and thereby causing the clamp F to come down upon the board and hold it at its end, and also causing the cross head D to move forward and carry the cut off saw G across the end of the board to square the same, and then the horizontal grooving saw across the end of the board to form the horizontal groove therein; and the continuation of the movement then automatically carries the cross head back to its retracted position and automatically releases or lifts the clamp from the board, when the pin $n$ on the friction wheel N will again strike against the cam bar P and stop the further movement automatically. The operator then slips the board on the table E until its opposite end is in position to be squared by the other cut off saw G', when he puts his foot on the other treadle R', thus causing the operating mechanism of the second clamp F' to automatically throw said clamp down upon the board and move forward the other cross head D' and thus square this other end of the board and form a tongue thereon.

I claim—

1. In a machine for forming interfitting tongues and grooves on the opposite ends of flooring boards of various lengths, the combination of the following parts or elements, to-wit: a table for supporting the board; a guide on the table for the side edge of the board to fit against; a clamp near one end of the guide; a transversely reciprocating cross head; a cut off saw mounted on this cross head; a grooving tool mounted on this cross head; mechanism for reciprocating the cross head; mechanism for automatically operating said clamp; a second transversely reciprocating cross head; a cut off saw mounted on said last mentioned cross head; tonguing tools mounted on said last mentioned cross head; a second clamp for holding the board in position while being operated upon by the tools carried by said second cross head; mechanism for reciprocating said cross head, and mechanism for automatically operating said second mentioned clamp, substantially as specified.

2. In a machine for forming interfitting tongues and grooves on the opposite ends of flooring boards of various lengths, the combination of the following parts or elements, to-wit: a table for supporting the board; a guide on the table for the side edge of the board to fit against; a clamp near one end of the guide; a transversely reciprocating cross head; a grooving tool mounted on this cross head; mechanism for reciprocating the cross head; mechanism for automatically operating said clamp; a second transversely reciprocating cross head; tonguing tools mounted on said last mentioned cross head; a second clamp for holding the board in position while being operated upon by the tools carried by said second cross head; mechanism for reciprocating said cross head; and mechanism for automatically operating said second mentioned clamp, substantially as specified.

3. The combination with a table B, of a guide C thereon for the side edge of the board to fit against, a clamp F, a transversely reciprocating tool carrying cross head G, mechanism for reciprocating said cross head, and mechanism for automatically operating said clamp, substantially as specified.

4. The combination with table B, of guide C thereon for the side edge of the board to fit against, a clamp near the end of said guide for holding the board in position, a transversely reciprocating cross head a cut off saw mounted on said cross head, a grooving tool mounted on said cross head; mechanism for reciprocating said cross head, and mechanism for automatically operating said clamp and releasing the board, substantially as specified.

5. The combination with a table B, of a guide C thereon for the side edge of the board to fit against, a clamp F, a transversely reciprocating tool carrying cross head G, mechanism for reciprocating said cross head, mechanism for automatically operating said clamp, and a clutch lever R for setting said cross head reciprocating mechanism in operation, substantially as specified.

6. In a machine for forming interfitting tongues and grooves on the opposite ends of flooring boards of various lengths, the combination of the following parts or elements, to-wit: a table for supporting the board; a guide on the table for the side edge of the board to fit against; a clamp near one end of the guide; a transversely reciprocating cross head; a cut off saw mounted on this cross head; a grooving tool mounted on this cross head; mechanism for reciprocating the cross head; mechanism for automatically operating said clamp; a second transversely reciprocating cross head; a cut off saw mounted on said last mentioned cross head; a second clamp for holding the board in position while being operated upon by the tools carried by said second cross head; mechanism for reciprocating said cross head; mechanism for automatically operating said second mentioned clamp, and two clutch levers R R' for independently setting in operation the mechanisms for operating said cross heads, substantially as specified.

7. In a machine for forming interfitting tongues and grooves on the opposite ends of flooring boards of various lengths, the combination of the following parts or elements, to-wit: a table for supporting the board; a guide on the table for the side edge of the board to fit against; a clamp near one end of the guide; a transversely reciprocating cross head; a grooving tool mounted on this cross head; mechanism for reciprocating the cross head; mechanism for automatically operating said clamp; a second transversely reciprocating cross head; tonguing tools mounted on said last mentioned cross head; a second clamp for holding the board in position while being operated upon by the tools carried by said second cross head; mechanism for reciprocating said cross head; mechanism for automatically operating said second mentioned clamp; and two levers R and R' for independently setting in operation the two independent mechanisms for independently operating said cross heads, substantially as specified.

8. The combination of table B with guide C; two independently transversely reciprocating tool carrying cross heads D D'; two independently and automatically operated clamps F F'; a driving shaft K mounted in movable spring actuated boxes or bearings $K^3$ and provided with friction wheels $K^2 K^2$; shafts M furnished with friction wheels N N'; cam bars P P'; pins $n$ on the friction wheels N N' and adapted to engage said cam bars P P'; treadles R R' connected to said cam bars P P'; crank wheels $m\ m'$ on said shafts M M'; levers S S' connected therewith and operated thereby; links $S^2$ connecting said levers S S' with said cross heads D D'; rock shafts T T' connected to and operating said clamps F F', substantially as specified.

9. The combination of table B with guide C, tool carrying cross head D, clamp F, movable driving shaft K furnished with friction wheel $K^2$, shaft M, furnished with crank wheel $m$ and with friction wheel N having pin $n$, sliding cam bar P, lever R for operating said cam bar, and lever S operated by said crank $m$ and connected to said cross head, substantially as specified.

10. The combination of table B with guide C, tool carrying cross head D, clamp F, movable driving shaft K furnished with friction wheel $K^2$, shaft M, furnished with crank wheel $m$ and with friction wheel N having pin $n$, sliding cam bar P, lever R for operating said cam bar, and lever S operated by said crank $m$ and connected to said cross head, rock shaft T secured to said lever S and connected to said clamp F for operating the same, substantially as specified.

JOHN P. BURNHAM.

Witnesses:
H. M. MUNDAY,
S. E. CURTIS.